Feb. 6, 1951     E. J. FICK     2,540,477
POWER DISTRIBUTION
Filed June 10, 1946
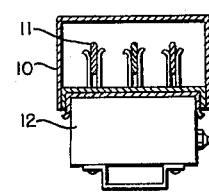
Fig. 1
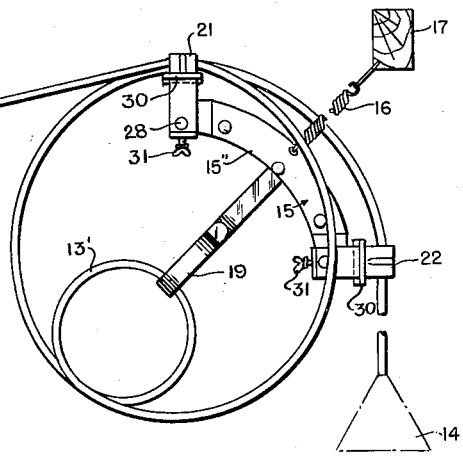
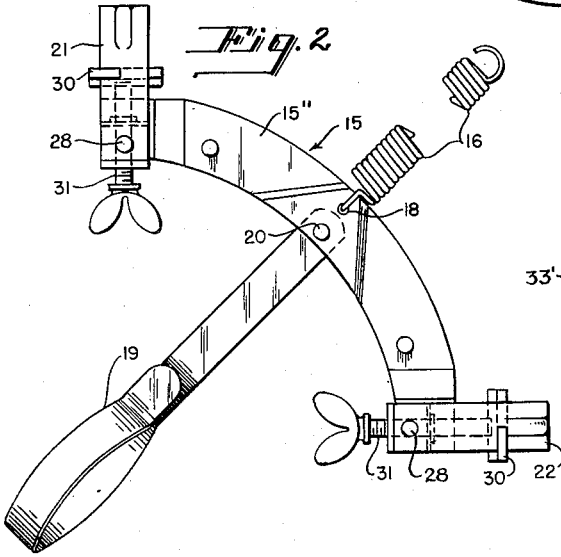
Fig. 2
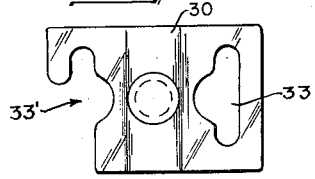
Fig. 6
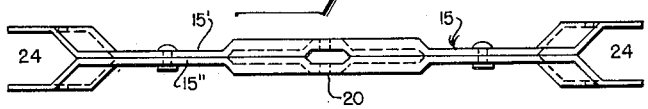
Fig. 4
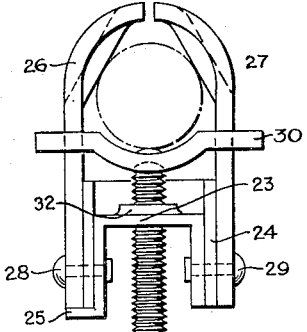
Fig. 3
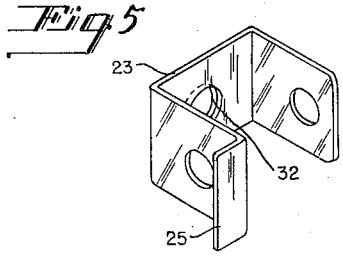
Fig. 5
INVENTOR.
EDWARD J. FICK.
BY
ATTORNEY Patented Feb. 6, 1951

2,540,477

UNITED STATES PATENT OFFICE 2,540,477

POWER DISTRIBUTION

Edward John Fick, Cheviot, Ohio, assignor to The Trumbull Electric Manufacturing Company, Plainville, Conn., a corporation of Connecticut Application June 10, 1946, Serial No. 675,530

5 Claims. (Cl. 248—58)

This invention relates particularly to bus bar duct systems in which branch cable connections are plugged in at various points depending upon the location of the power consuming devices at the time.

In order to be sure and have cable enough for practically any location, it is customary to provide lengths which are frequently found considerably longer than necessary. In order to dispose of the excess length of cable, it has been proposed to provide an overhead channel on top of the main bus bar duct in which it can be stored. Such a construction requires the addition of flanges or their equivalent throughout the length of the duct even though it may not be needed except at a few places.

One object of my invention is to provide a takeup means which can be installed at any place, where it may be needed.

Another object is to provide a device which can accommodate various excess lengths.

Another object is to provide a device which can be easily installed and adjusted.

Accordingly I provide a hanger which preferably has a hook on which a coil of excess cable can be hung and clamps for holding the cable.

Fig. 1 is a view showing on a small scale the invention in use.

Fig. 2 is a side view of the hanger on a larger scale.

Fig. 3 is a side view of one of the cable clamps.

Fig. 4 is an edge view of the hanger.

Fig. 5 is a perspective view of the base or yoke of one of the clamps.

Fig. 6 is a plan view of one of the clamping plates.

For the purpose of understanding the invention, I have shown a conventional duct 10 containing bus bars 11 and having a distribution box or branch box 12 of any suitable type.

The cable 13 leads from the branch box to the point 14 where the work is to be performed.

The hanger 15 is preferably suspended by a spring 16 which is anchored at a convenient point 17. The hanger 15 is in the form of a curved arm representing approximately an arc of one-quarter of a circle.

This hanger is preferably formed of two parts 15' and 15" suitably secured together. The spring 16 is connected to the hanger at 18 and a hook 19 is connected at 20 and may have freedom to swing to accommodate a coil 13' of the cable. The spring resiliently carries the weight of the hanger and the cable.

Cable clamps, such as 21 and 22, are carried by the opposite ends of the hanger.

Each clamp has a U-shaped yoke or base 23 mounted between a forked end 24 of the hanger. One end of the yoke has a flange 25 which is positioned by one end of the fork. Clamp jaws 26 and 27 are secured to the fork and to the yoke by pins 28 and 29. A clamp plate 30 is slidably mounted on the jaws 26 and 27 and adapted to be moved back and forth by a clamp screw 31 which is adjustable in a screw seat 32 in yoke 23. Plate 30 has a slot 33 for jaw 26 so as to ensure a straight sliding movement of the plate on the jaws as jaw 26 cannot rotate on pin 28 because of flange 25 of the yoke. The other side of plate 30 has an open recess 33' into which the pivoted jaw 27 is adapted to be swung after the cable is applied to the clamp. The active ends of the jaws are preferably shaped so that they will not damage the cable when the clamps are applied.

The clamps are arranged to extend radially outward from the hanger arms at right angles to each other and so that the openings for the cable are at approximately right angles to each other and therefore can hold approximately one-quarter of a circular coil of cable as shown in Fig. 1.

To install the device a suitable location for the support 17 is selected and the hanger hooked up. The cable is then stretched from the box 12 to the clamp 21 and the excess length of cable coiled and hung on the hook 19. The other end of the coil is thus secured by clamp 22 and the cable led to the machine where the work is to be done.

According to this invention, it is only necessary to provide hangers at places where there is slack enough of the cable to require them. These hangers can be moved from place to place as occasion demands.

The form of the hanger makes it possible to take-up varying lengths of cable and in fact after being installed the excess coil can be increased or decreased in size without moving the hanger.

It is preferred that the hook 19 will be pivotally secured to the hanger 15 in the same hole that secures the spring 16 to the hanger. In this arrangement, the end of the spring is passed simultaneously through both hole 18 in the hanger 15 and the pivot point in the end of hook 19. This has the advantage of eliminating one set of holes in the hanger, and the rivet or pin at 20 in the drawings. When the spring is removed, the hook and the hanger will come apart, thereby enabling the hanger, hook and spring to be packed and stored in a small space.

I claim:

1. A cable hanger formed of two plates spaced apart at their ends and secured together between the ends, U-shaped clamp seats secured between the ends of said hanger, cable jaws mounted on each clamp seat, clamp plates slidable on the jaws of the respective seats, one of the jaws of each seat being hinged to the side of its seat to permit it to swing out of the way for insertion of a cable between the jaws and a screw passing through each seat for pressing against the plate on its jaws.

2. A hanger formed of two plates with forked ends, a yoke mounted in each forked end, a pair of cable jaws carried by each yoke and forked hanger end, a clamp plate cooperating with each pair of jaws and a clamp screw seated in each yoke and coacting with its clamp plate to force a cable section between the cooperating jaws.

3. A cable hanger comprising an elongated body having cable clamps disposed at substantially right angles to each other for holding a cable coil at two spaced points, a coil supporting hook hinged to said body midway between said clamps, and means for attaching said body to a support at approximately midway its ends.

4. A cable hanger having an elongated body with forked ends disposed at substantially right angles to each other, a pair of cable clamping jaws supported by each forked end, a movable clamping plate cooperating with each pair of jaws, and means coacting with each clamping plate for moving the latter to force a cable section between the respective cooperating plate and jaws.

5. A cable hanger comprising a curved arm having a pair of jaws at each end for clampingly holding a convolution of a coiled cable against longitudinal movement, a spiral spring fastened to said arm intermediate its ends for resiliently attaching said arm to a support and a hook pivotally supported by said arm in line with said spring and extending at an angle thereto for supporting another convolution of the same coiled cable, said hook being movable in a path in the plane of the body of the arm.

EDWARD JOHN FICK.

REFERENCES CITED

The following references are of record in the file of this patent:

UNITED STATES PATENTS

| Number | Name | Date |
| --- | --- | --- |
| 655,951 | Bates | Aug. 14, 1900 |
| 1,951,890 | Waldau | Mar. 20, 1934 |
| 2,086,927 | Talbott | July 13, 1937 |
| 2,253,444 | Muller | Aug. 19, 1941 |
| 2,358,946 | Tornblom | Sept. 26, 1944 |
| 2,362,137 | Kagan | Nov. 7, 1944 |

FOREIGN PATENTS

| Number | Country | Date |
| --- | --- | --- |
| 331,121 | Italy | Oct. 30, 1935 |